(12) United States Patent
Gelderland et al.

(10) Patent No.: US 6,413,303 B2
(45) Date of Patent: *Jul. 2, 2002

(54) ACTIVATED CARBON AIR FILTERS

(75) Inventors: Sigrid M. R. Gelderland, Waalre; Johannes Marra, Eindhoven, both of (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,330

(22) Filed: Mar. 11, 1999

(30) Foreign Application Priority Data

Mar. 12, 1998 (GB) ................................................ 9805224

(51) Int. Cl.⁷ .............................. B32B 3/12; B01D 53/02
(52) U.S. Cl. ............................. 96/135; 55/527; 55/528; 55/DIG. 5; 55/521; 96/154; 162/145; 162/152
(58) Field of Search ........................ 55/521, 522, 524, 55/DIG. 5, 527, 528; 162/100, 145, 152; 96/135, 134, 125, 154, 153

(56) References Cited

U.S. PATENT DOCUMENTS

| | | | | |
|---|---|---|---|---|
| 2,038,071 A | * | 4/1936 | Wilhelm | |
| 3,664,095 A | * | 5/1972 | Asker et al. | |
| 3,870,495 A | * | 3/1975 | Dixson et al. | |
| 4,093,435 A | * | 6/1978 | Marron et al. | 96/125 |
| 4,289,513 A | * | 9/1981 | Brownhill et al. | 55/527 |
| 4,421,599 A | * | 12/1983 | Kazuoka et al. | 162/145 |
| 4,992,084 A | * | 2/1991 | Von Blucher et al. | 55/524 |
| 4,992,319 A | * | 2/1991 | Kurosawa et al. | 55/524 |
| 5,194,414 A | * | 3/1993 | Kuma | |
| 5,221,300 A | * | 6/1993 | Hoogland et al. | |
| 5,352,274 A | * | 10/1994 | Blakley | |
| 5,505,769 A | * | 4/1996 | Dinnage et al. | 55/524 |
| 5,571,604 A | * | 11/1996 | Sprang et al. | |
| 5,593,646 A | * | 1/1997 | Koshiba et al. | 55/524 |
| 5,685,897 A | * | 11/1997 | Belding et al. | 55/528 |
| 5,968,214 A | * | 10/1999 | Nagata et al. | 55/524 |
| 5,997,991 A | * | 12/1999 | Kato et al. | 55/524 |
| 6,071,479 A | * | 6/2000 | Marra et al. | |
| 6,227,383 B1 | * | 5/2001 | De Ruiter et al. | |

FOREIGN PATENT DOCUMENTS

| | | | |
|---|---|---|---|
| EP | 0492879a1 | 7/1992 | ............ B01J/20/28 |
| EP | 0727245 A1 | 8/1996 | ............ B01D/46/52 |
| SE | 7711774-5 | 2/1984 | ............ B01D/53/26 |

* cited by examiner

Primary Examiner—Duane Smith
Assistant Examiner—Minh-Chau T. Pham
(74) Attorney, Agent, or Firm—Ernestine C. Bartlett

(57) ABSTRACT

An activated carbon air filter for use in room air cleaners and the like has a corrugated paper structure formed of substantially non-porous paper, preferably Kraft paper, whose surface is coated with carbon by means for example of a dipping process in which the structure is immersed in an aqueous slurry containing carbon and a binder. Through use of a particular paper thickness and channel dimensions, a highly efficient, low volume, long lifetime air cleaning filter is obtained.

7 Claims, 1 Drawing Sheet

ACTIVATED CARBON AIR FILTERS

BACKGROUND OF THE INVENTION

Figure 1:
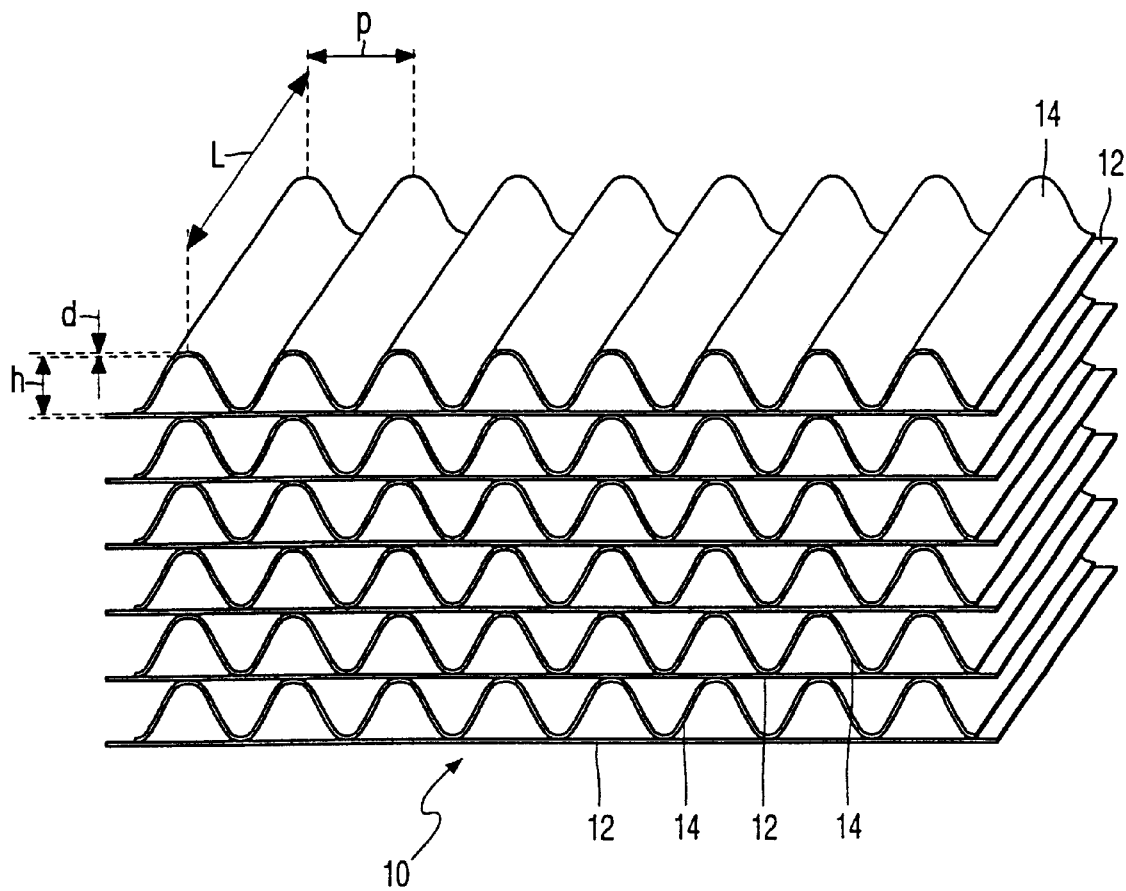

This invention relates to air filters and methods of manufacturing the same. In particular, the invention concerns corrugated paper filter structures using activated carbon for cleaning air.

Such active carbon filters are employed in air cleaning equipment such as room air cleaners and other air filtration devices in which, for example, air is passed over the filter by means of an air moving device such as a fan whereby the active carbon filter removes, inter alia, organic gases, radon, ozone and $NO_2$ from the air-flow through adsorption.

The performance of the filter is determined by the gas-removal efficiency, the capacity and the pressure drop (air resistance). The gas-removal efficiency is determined, along with the absorption capacity, by the quantity of effective active carbon, and, along with the pressure drop, also by the structure of the filter.

SUMMARY OF THE INVENTION

An object of the present invention is to provide an activated carbon air filter which has improved performance.

It is another object of the present invention to provide an activated carbon air filter which provides a high gas-removal efficiency and a high capacity combined with a low pressure drop and a small volume.

The invention provides a carbon filter of corrugated paper structure which is optimised in terms of its cost, the obtained carbon weight per unit filter volume, the corrugation specifics of the filter, the face area of the filter and the filter thickness, the pressure drop across the carbon filter, the adhesion of the carbon coating to the corrugated paper support medium, and which can be utilised advantageously in an air cleaner wherein specific boundary conditions exist with respect to the process conditions, particularly air speed, pressure drop, filter volume, and one-pass air cleaning performance.

According to one aspect of the present invention there is provided an activated carbon air filter comprising a corrugated paper structure carrying activated carbon, which is characterised in that the paper comprises a substantially non-porous, organic fiber paper and in that the activated carbon is provided as a coating on the paper surface.

According to another aspect of the present invention there is provided a method of making an activated carbon air filter comprising a corrugated paper structure carrying activated carbon, which method comprises forming the corrugated paper structure from substantially non-porous, organic fiber paper and thereafter applying the activated carbon in the form of a coating on the surface of the corrugated paper.

Conventionally, activated carbon paper air filters comprise an inorganic fiber, porous, paper which is impregnated with the carbon, with the carbon particles dispersed in the voids between the paper fibers, prior to the paper being corrugated and formed into a honeycomb structure. Such filters tend to have a limited carbon content, and typically the carbon loading is around 70 gms/liter of filter volume.

Through using a substantially non-porous paper and providing the carbon as a coating on the surface of the paper, with the carbon coating confined and adhering to the paper surface, considerable improvement in the operational effectiveness of the filter is obtained. In a preferred embodiment, the corrugated paper is formed into a honeycomb structure having air channels approximately 1 mm in diameter, preferably using an E-flute construction having a cell height between 1.2 to 1.4 mm and a pitch of substantially 3 mm, and with a carbon coating approximately 0.1 to 0.2 mm thick, then a carbon loading of approximately 130 gm of carbon per liter of filter volume is achieved which dramatically improves air cleaning performance. The channel size selection results in filter functionality, particularly efficiency, lifetime, pressure drop and filter volume, being optimised.

Preferably, the non-porous paper comprises Kraft paper, desirably having a density of approximately 49 gm/m$^2$. The fiber density of such paper is sufficient to prevent carbon particles of around 50 µm or more diameter penetrating the fibrous interior, thus ensuring that the carbon remains confined to the paper surface to which it adheres. Kraft paper offers the advantages of low cost, ease of paper corrugation before coating, and low weight as well as providing desired properties for ensuring adequate adherence of the carbon coating to its surface.

In a preferred method of making the air filter, the carbon coating is applied using an aqueous slurry; including a binder, preferably carboxymethylcellulose, which provides consistency and promotes good adhesion of the coating, to the paper. The coating is applied by partly immersing the corrugated paper structure in the slurry, preferably with prior wetting of the paper, and drawing the slurry up through the corrugation channels, for example using capillary action or by sucking, and thereafter forcing the slurry out, by air blowing or the like, and drying, thereby leaving a homogeneous and dense carbon coating on the paper surface.

According to a further aspect of the present invention, there is provided an air cleaning device comprising an activated carbon air filter in accordance with the first aspect of the invention and air moving means operable to produce a flow of air through the air filter.

BRIEF DESCRIPTION OF THE INVENTION

Figure 2:
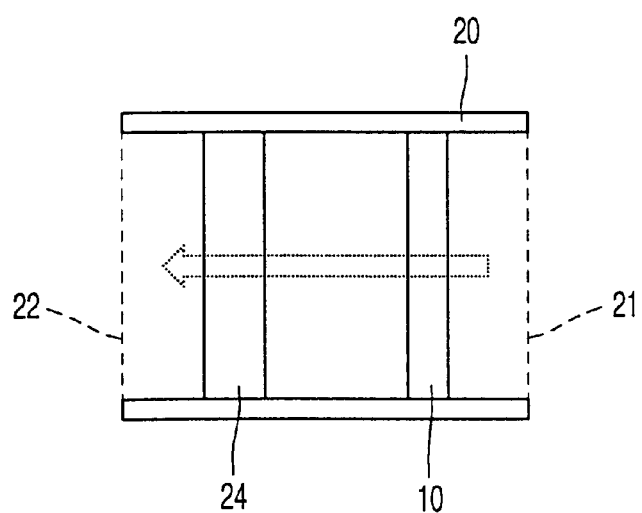

Embodiments of air filters and their methods of manufacture in accordance with the present invention will now be described, by way of example, with reference to the accompanying drawing, in which:

FIG. 1 is a schematic perspective view of part of the structure of one example embodiment of air filter; and FIG. 2 shows schematically and highly simplified a cross-section through an air cleaning device incorporating the air filter.

DESCRIPTION OF THE PREFERRED EMBODIMENTS

Referring to FIG. 1, in this embodiment a support, generally referenced at 10, having the structure of the eventual filter is coated with carbon by means of a dipping process which involves immersing the structure in an aqueous slurry containing carbon. The support material is a strong paper structure consisting of several alternately stacked flat and corrugated sheets, 12 and 14, of Kraft paper which are glued together by means of a water-resistant glue.

Stacking of these sheets results in a honeycomb-like structure having many mutually parallel channels. The paper thickness (d) preferably ranges from 0.1 to 0.2 mm, and the channel diameter ranges from 1.2 to 2 mm. Using a wet coating process, this preformed paper structure is coated with an aqueous slurry of a binder—containing active carbon powder in water. The particle size of the powder is less than 150 µm. The binder is a cellulose ether, for example carboxymethyl-cellulose, methyl cellulose, or a thermoplastic material, for example polyvinyl alcohol, which is present in a quantity of at least 4% relative to the quantity of active carbon.

The coating process comprises the following steps. Pre-wetting of the paper, for example by spraying, is desirable to prevent the possibility of the slurry clotting during coating which would otherwise result in channel blockages. The preformed paper honeycomb structure is therefore water-humidified and then (partly) arranged in the slurry, the channels being in the vertical position. The slurry is then sucked upwards, for example, with the aid of a slight vacuum, so that all channels are filled with the slurry substantially uniformly. Following this, the slurry is forced from the channels by application of an over-pressure (compressed air) and air is blown through the channels to open the channels. Thereafter, the carbon-coated paper structure is dried, by blowing dry air through the channels, leaving a homogeneous and dense activated carbon coating on the paper surfaces which is smooth and non-powdery. The carbon loading in the corrugated paper structure is determined by the thickness of the dried coating which, in turn, is determined by the viscosity of the carbon slurry. A high viscosity results in more slurry remaining in the channels after drainage and a high viscosity is obtained by either increasing the carbon fraction or by a high molecular weight binder. A high carbon fraction in combination with the use of a low molecular weight binder, e.g. carboxymethyl-cellulose, is preferred because it results in greater carbon coating.

In this manner, a satisfactorily adhering active carbon layer of 0.1–0.2 mm is applied to the paper channel walls. The "one-pass-efficiency" for the removal of most organic gases with such a filter is 90%.

The addition of a binder to the carbon slurry assists in accomplishing sufficient internal consistency in the carbon coating and ensures good carbon adhesion to the paper. The adsorption capacity of the filter is slightly adversely affected by the presence of the binders but is predominantly determined by the adsorption capacity of the active carbon powder used. A binder fraction of 4% is sufficient to obtain a good adhesion. A binder fraction of 16% or more causes the adsorption capacity to decrease substantially. The filter comprises about 130 to 150 grams of active carbon per liter of filter volume. Thus, a 3.5 liter volume can contain around 500 grams of carbon. The air meets little resistance upon passing through the filter. For example, at an air velocity v=1 mls, the pressure drop across a filter having a length L=40 mm is 40–45 N/m².

The paper used is made from organic fibers and has a dense, substantially non-porous, form. Kraft paper is particularly preferred. This is a kind of paper made from cellulose fibers according to the so-called Kraft process. Such paper tends to be slightly hydrophobic, so wetting with water is resisted, and is dense, though not-completely non-porous. However, its fiber density is sufficient to prevent activated carbon particles of, say, 50 $\mu$m or greater in diameter penetrating the fibrous interior of the paper sheet. The coated carbon slurry thus remains confined substantially to the surface of the paper to which it adheres.

Kraft paper offers the advantages of low cost, low weight, and environmentally-friendly disposability. Further, it has an inherent stiffness which is beneficial and can easily be corrugated prior to coating and provides adequate adherence of the carbon coating to its surface.

In a particularly preferred embodiment, bleached Kraft paper having a weight of approximately 49 grams/m² is utilised. This is corrugated, prior to the carbon coating process, to a standard E-flute, with a cell height (h) of 1.2 to 1.4 mm and a pitch (P) between 3 mm and 3.2 mm. These parameters are important for optimising the filter functionality with regard especially to efficiency, lifetime, pressure drop and filter volume.

The corrugated paper can be rolled up, stacked, fan-folded or otherwise assembled to produce the desired filter shape, such as for example the structure shown in the drawing. The overall thickness (L) of the filter structure in this embodiment is around 30 mm to 40 mm. Following the subsequent coating of the corrugated paper walls using an activated carbon slurry and drying process as described above, the air channels in the resulting carbon honeycomb filter have a diameter close to 1 mm, with the amount of carbon contained in the surface coating being around 130 grams/liter of filter, which provides exceptional air cleaning performance.

Instead of coating the paper by a dipping process, it is envisaged that a flow coating method may be used in which the slurry is poured over the, paper structure and then sucked or blown through the channels.

In summary, therefore, there is disclosed an activated carbon air filter for use in room air cleaners and the like which comprises a corrugated paper structure formed of substantially non-porous paper, preferably Kraft paper, whose surface is coated with carbon by means for example of a dipping process in which the structure is immersed in an aqueous slurry containing carbon and a binder. Through use of a particular paper thickness and channel dimensions, a highly efficient, low volume, long lifetime air cleaning filter is obtained.

FIG. 2 shows schematically in cross-section and in simplified form an air cleaning device using this air filter. The filter, 10, is mounted in a housing 20, defining a passage for the flow of air between an air inlet 21 and an air outlet 22, together with an air moving device 24, such as an electrically driven fan, which is operable to produce a flow of air, as indicated by the arrow, from the inlet to the outlet and through the filter, the air channels defined by the corrugations of the filter being aligned with the air flow direction. Rather than being arranged to draw air through the filter in this manner, the air moving device may of course be arranged to blow air through the filter instead.

What is claimed is:

1. An air filter comprising a corrugated paper structure carrying activated carbon, characterised in that the paper comprises a substantially non-porous, organic fiber paper and in that the activated carbon is provided as a coating on the paper surface.

2. An air filter according to claim 1, wherein the filter comprises at least around 130 grams of active carbon per liter of filter volume.

3. An air cleaning device comprising an activated carbon air filter as claimed in claim 1, and air moving means for producing a flow of air through the air filter.

4. An activated carbon air filter comprising a corrugated paper structure carrying activated carbon, wherein the corrugated paper structure comprises a honeycomb structure having air channels approximately 1 mm in diameter, the paper comprises a substantially nonporous, organic fiber paper and the activated carbon is provided as a coating on the paper surface.

5. An air filter according to claim 4, characterised in wherein the corrugated paper is of an E-flute construction having a cell height between substantially 1.2 to 1.4 mm and a pitch of substantially 3 mm.

6. An air filter comprising a corrugated paper structure carrying activated carbon, wherein the paper comprises kraft paper and, the activated carbon is provided as a coating on the paper surface.

7. An air filter according to claim 6, wherein the paper has a density of approximately 49 gm/m$^2$.

* * * * *